(12) United States Patent
Hiraoka et al.

(10) Patent No.: US 7,561,591 B2
(45) Date of Patent: Jul. 14, 2009

(54) TDMA COMMUNICATIONS APPARATUS

(75) Inventors: Yasushi Hiraoka, Nishinomiya (JP);
Kazuhiko Nobunaga, Nishinomiya (JP)

(73) Assignee: Furuno Electric Company, Limited, Nishinomiya-shi (JP)

( * ) Notice: Subject to any disclaimer, the term of this patent is extended or adjusted under 35 U.S.C. 154(b) by 1052 days.

(21) Appl. No.: 10/790,772

(22) Filed: Mar. 3, 2004

(65) Prior Publication Data
US 2004/0174895 A1    Sep. 9, 2004

(30) Foreign Application Priority Data
Mar. 4, 2003    (JP) .............................. 2003-057579

(51) Int. Cl.
*H04B 7/212* (2006.01)
(52) U.S. Cl. ....................... 370/442; 370/337; 370/445; 370/468
(58) Field of Classification Search ........................ None
See application file for complete search history.

(56) References Cited

U.S. PATENT DOCUMENTS

| | | | | |
|---|---|---|---|---|
| 5,719,859 A | * | 2/1998 | Kobayashi et al. | 370/347 |
| 5,726,983 A | * | 3/1998 | Bakke et al. | 370/337 |
| 5,931,964 A | * | 8/1999 | Beming et al. | 714/748 |
| 6,154,655 A | * | 11/2000 | Borst et al. | 455/451 |
| 6,249,515 B1 | | 6/2001 | Kim et al. | |
| 6,570,861 B1 | * | 5/2003 | Marsan et al. | 370/330 |
| 6,577,610 B1 | * | 6/2003 | Kronz | 370/322 |
| 6,798,761 B2 | * | 9/2004 | Cain et al. | 370/337 |
| 6,804,208 B2 | * | 10/2004 | Cain et al. | 370/326 |
| 6,930,993 B1 | * | 8/2005 | Hamada et al. | 370/347 |
| 7,072,313 B2 | * | 7/2006 | Kronz | 370/322 |
| 2002/0003784 A1 | * | 1/2002 | Okabe et al. | 370/331 |
| 2003/0086373 A1 | * | 5/2003 | Kronz | 370/235 |

FOREIGN PATENT DOCUMENTS

| GB | 2321578 A | 7/1998 |
|---|---|---|
| WO | WO-01/88664 A2 | 11/2001 |

* cited by examiner

*Primary Examiner*—Bob A Phunkulh
(74) *Attorney, Agent, or Firm*—Birch, Stewart, Kolasch & Birch, LLP

(57) ABSTRACT

If own station detects that a slot S2 previously reserved for own transmission has been occupied by another station when transmitting a message at a current slot S3, the own station sets the occupied slot to a time-out value of zero S0 upon transmitting the message at the current slot S3. At the same time, the own station re-reserves a new slot S5 within an SI in a succeeding frame so that transmission from the own station at the new slot S5 does not conflict with transmission from the other station at the occupied slot, now reserved by other station as slot A.

9 Claims, 17 Drawing Sheets

SLOTS RESERVED FOR OWN STATION ARE WRITTEN IN SLOT ALLOCATION TABLE.

ALREADY RESERVED SLOT HAS BEEN OVERWRITTEN BY ANOTHER STATION.

OWN STATION CANCELS CURRENT SLOT ALLOCATION BY TRANSMITTING TIME-OUT 0 AND RESERVES ANOTHER SLOT IN THE NEXT FRAME.

EXAMPLE OF VIOLATION IN WHICH A STATION RESERVES UNUSED SLOTS OR EXEEDS AVAILABLE RANGE

EXAMPLE OF VIOLATION IN WHICH A STATION RESERVES A SLOT OUTSIDE OF PERTINENT SI

TDMA COMMUNICATIONS APPARATUS

This Nonprovisional application claims priority under 35 U.S.C. § 119(a) on Patent Application No. 2003-057579 filed in JAPAN on Mar. 4, 2003, the entire contents of which are hereby incorporated by reference.

BACKGROUND OF THE INVENTION

1. Field of the Invention

The present invention relates to a Time Division Multiple Access (TDMA) communications apparatus for carrying out communication using TDMA technology in which a frame is divided into a plurality of time slots, a slot being treated as a unit of data transmission.

2. Description of the Related Art

In a TDMA communication system, each successive frame is divided into a plurality of time slots based on a common time reference (time base) obtained from the global positioning system (GPS), for example, thereby establishing accurate slot synchronization among a plurality of participating stations (e.g. mobile units such as ships). The participating stations carry out TDMA communication while reserving (allocating) slots for their own transmission of information and messages. In this kind of communication system, such as the Universal Automatic Identification System (UAIS) of which carriage has been required on particular classes of ships since 2002, it is essential for every participating station to communicate data in accordance with defined protocols. To enable proper slot allocation for transmission of information and messages by multiple users in the UAIS, international and national standards set out detailed technical operational rules and specifications including Self-Organized Time Division Multiple Access (SOTDMA).

One problem in the TDMA communication system is that if any user obviously violates the relevant standards or rules, such as UAIS access protocols, or acts against the spirit underlying the standards and rules, a serious difficulty occurs in the operation of the UAIS, resulting in an inability to ensure efficient and safe navigation of ships.

SUMMARY OF THE INVENTION

In light of the foregoing, it is an object of the invention to provide a TDMA communications apparatus which can ensure stable operation of own station by preventing the occurrence of slot allocation conflicts with other stations even when any of the other stations transmits in obvious violation of defined protocols or against the spirit underlying defined standards and rules.

A protocol used for slot allocation in autonomous and continuous mode of the UAIS in its stable operating condition is the SOTDMA protocol. The SOTDMA protocol makes it possible to reserve as many free slots as the value of time-out in several frames succeeding to a current frame at the same location as a current slot. (In practice, message 1 is used to realize SOTDMA protocol.)

The time-out is a parameter specifying a number of frames at each slot in which an owner station of a slot can send a message exclusively.

After lapsing these frames the transmit station will reserve another slot specifying the new time-out value in its message.

While slots are successively reserved for own station by using the SOTDMA protocol in the autonomous and continuous mode, there is a possibility that another station will reserve, or occupy, a slot which has already been reserved by the own station, in violation of the protocol. Should this situation occur and is left unresolved, there will arise a conflict of transmission in the pertinent slot.

The present invention provides an arrangement which enables the own station to resolve this kind of slot allocation conflict by re-reserving another slot in a succeeding frame for own transmission within a predefined period upon detecting that a slot already reserved for own use has been reserved by another station, when transmitting a message of own station. The "predefined period" means a specific period including the slot occupied by the other station and consecutive slots thereof. In the UAIS, this period is referred to as a Selection Interval (SI) which is preset based on the speed, for example, of a mobile unit on which a TDMA communications apparatus of the invention (own station) is installed. Normally, multiple SIs are set in each frame and the own station reserves one slot in each successive SI. Thus, the arrangement of the invention allows each station to avoid transmission conflicts with other stations by re-reserving a new slot in place of any occupied slot beforehand.

In this invention, different protocols are used for re-reserving new slots depending on timing of detecting occupied slots.

The TDMA communications apparatus of the invention is provided with conflict avoidance means. When the conflict avoidance means of the own station detects that a slot reserved for own transmission in a next frame has been reserved by another station as well, the conflict avoidance means transmits a message indicating that the own station will re-reserve another slot for own use within the predefined period in the next frame. This slot allocation operation is performed by using the SOTDMA protocol.

When the conflict avoidance means of the own station detects that the slot reserved for own transmission within the next SI in a current frame has been reserved by another station as well, the conflict avoidance means transmits a message indicating that the own station will re-reserve another slot for own transmission within the next SI in the current frame. This slot allocation operation is performed by using Incremental Time Division Multiple Access (ITDMA) protocol. While the ITDMA protocol is almost the same as the SOTDMA protocol, the former has a function of reserving slots in the current frame by specifying an offset slot number from the current slot position in the transmission message in addition to the function of reserving slot in the next frame.

More particularly, when the conflict avoidance means of the own station detects that the slot reserved within a next SI for own use in the current frame has been occupied by another station, the conflict avoidance means transmits a message for re-reserving another free slot within the next SI as well as keeping the slot in the succeeding frame by using ITDMA protocol.

As stated in the foregoing, when the TDMA communications apparatus of the present invention detects that a slot reserved for own transmission in the next frame has been occupied by another station before its slot timing, or when the apparatus detects an occupied slot with sufficient time allowance, the apparatus can re-reserve a replacing free slot within an SI in the next frame by using the SOTDMA protocol. Also, when the TDMA communications apparatus detects that the slot reserved for own transmission within the next SI in the current frame has been reserved by another station before sending own message within the current SI, the apparatus can re-reserve a replacing free slot within the next SI by using the ITDMA protocol instead of ordinary SOTDMA. Since the TDMA communications apparatus can re-reserve a replacing slot, where necessary, it is possible to take action to resolve slot allocation conflicts with other stations caused by a "double-booking" situation as shown above. Furthermore, the TDMA communications apparatus can prevent missing transmissions within SIs involving slot allocation conflicts, and thus a reduction in report rate (message transmission rate), by re-reserving free slots to make up for occupied slots by using the ITDMA protocol in the aforementioned manner even when there is no own slot within each SI due to a "slot pile up" phenomenon which does not mean a "double-booking".

According to UAIS specifications, slots allocated for transmission by another station are regarded as free slots which can be freely used by the own station after a lapse of 3 minutes if no message is received in those slots as scheduled. If this inability to receive a message in a slot allocated to another station is caused by a conflict among multiple stations, the slot must not be regarded as a true free slot. In order to decide whether a slot is truly free, a TDMA communications apparatus in one form of the invention is provided with means for evaluating the level of a signal received in each slot a plurality of times and judging a slot in which the level of the received signal is less than a threshold a specific number of times as a free slot which may be reserved for own transmission without causing a conflict with other stations. When a particular slot has been judged to be a free slot by this means of the apparatus, the own station can reserve the relevant slot for own transmission.

The TDMA communications apparatus may include a memory for storing violations of individual protocols, such as slot allocation-related violations and transmission-related violations, together with station identifiers (IDs) in the form of violation log. Specifically, in another form of the invention, a TDMA communications apparatus for carrying out communication using TDMA technology in which a frame is divided into a plurality of slots, a slot being treated as a unit of data transmission and the TDMA communications apparatus performing TDMA communication while reserving slots for own transmission, includes a violation information memory for storing violations of individual protocols, such as slot allocation-related violations and transmission-related violations of individual stations, in a manner that allows a comparison between the content of a slot allocation table storing slot allocation status of each station and received messages. Preferably, the aforementioned violations of the protocols include not only obvious violations of UAIS rules but also acts against the spirit underlying the UAIS rules and specifications. The provision of the violation information memory in the TDMA communications apparatus of the invention would make it possible to promote improvements in operation and functional performance of the TDMA communications apparatus installed on a station referring to an off-line report output from the violation information memory.

It will be appreciated from the foregoing and the following detailed description that the invention will contribute to maintaining a normal state of data transmission using the TDMA technology even when slots allocated to the own station are occupied by another station as a result of a slot allocation conflict.

Furthermore, the TDMA communications apparatus of the invention serves to reduce the possibility of undesired conflicts since the apparatus can identify causes of individual errors and judge a slot in which an error has occurred due to a total absence of signals as being a free slot which may be reserved for the own station.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 1:
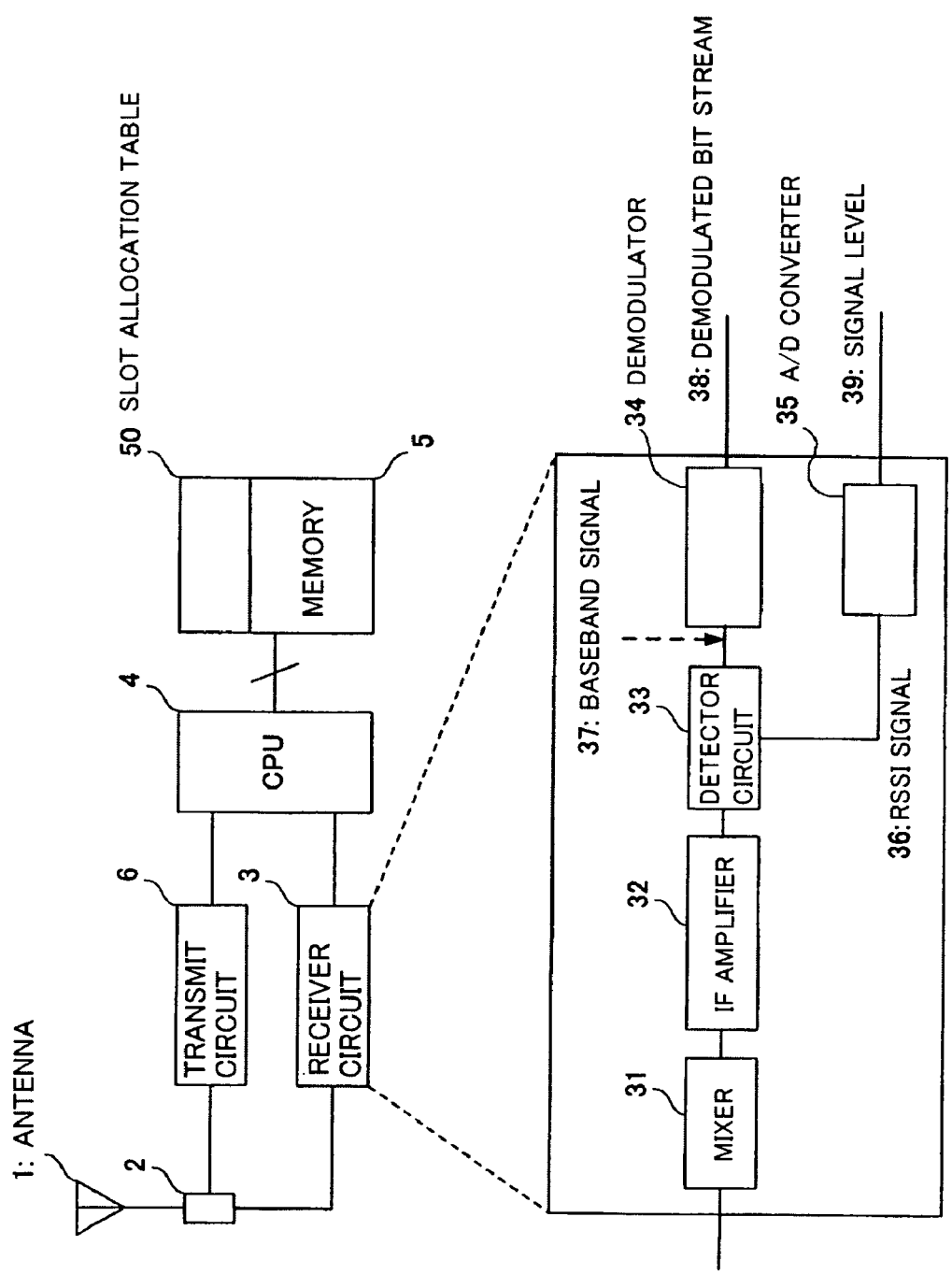
FIG. 1 is a general block diagram of a TDMA communications apparatus according to a preferred embodiment of the invention.
Figure 2:
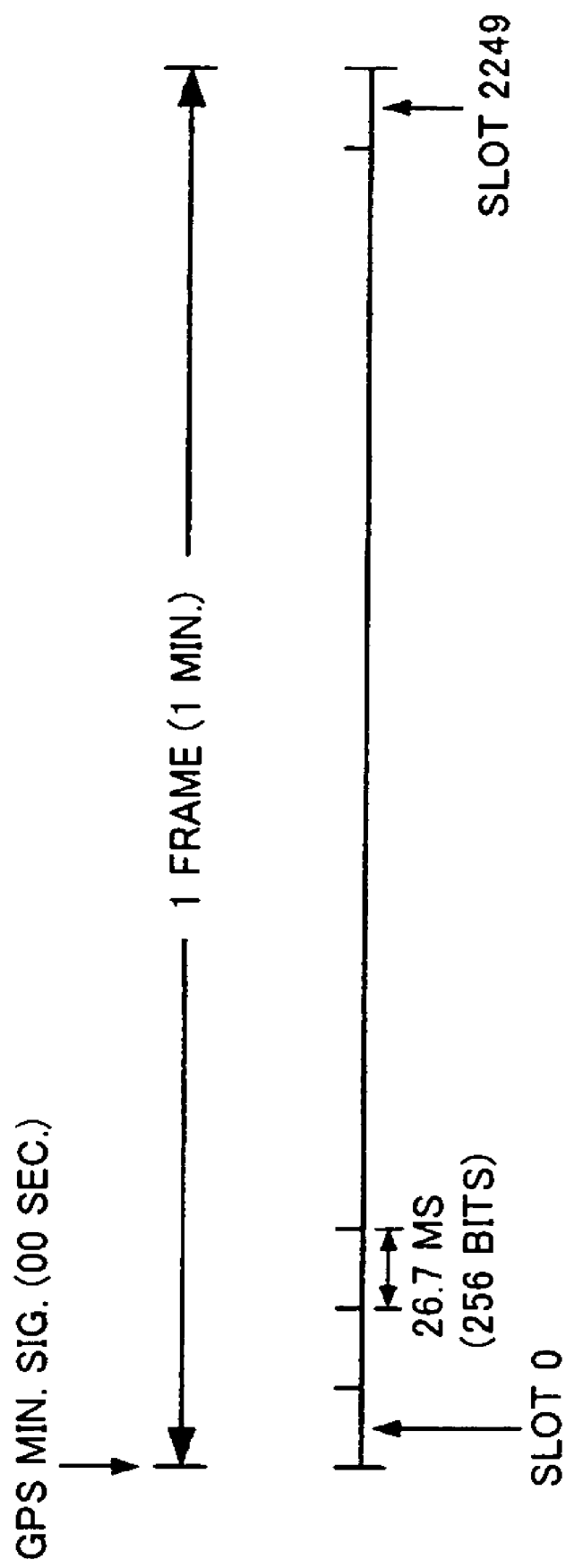
FIG. 2 is a diagram showing a frame structure applicable to UAIS equipment.

FIG. 1 is a general block diagram of a TDMA communications apparatus according to a preferred embodiment of the invention, and FIG. 2 is a diagram showing a frame structure defined as part of the UAIS specifications applied to the TDMA communications apparatus of the invention.

TDMA communication is a method of communication between a mobile station (e.g., a ship station) and a fixed station (e.g., a base station) or between mobile stations, in which one frame is divided into multiple slots and communication is performed using the slot as a unit of data transmission. According to the UAIS specifications, 2,250 slots are allocated in one frame which is 1-minute long as shown in FIG. 2. The duration of each slot is 26.7 ms and each slot contains 256 bits of information. Frame synchronization is achieved by use of a GPS 00-second signal output from a GPS receiver at the beginning of a frame, and slot 0, slot 1, slot 2, . . . , slot 2249 are allocated in this order in each frame.

Referring to FIG. 1, a 160 MHz signal modulated by a Gaussian Minimum Shift Keying Frequency Modulation (GMSK/FM) scheme is received by an antenna 1 and entered into a receiver circuit 3 through a switching circuit 2. The received signal is downconverted into an intermediate frequency (IF) signal carried by an local signal at a mixer 31. The IF signal is amplified by an IF amplifier 32 and converted into a baseband signal 37 by a detector circuit 33. The detected baseband signal 37 is demodulated by a demodulator 34 and a resultant signal is entered into a central processing unit (CPU) 4 as a demodulated bit stream 38. The detector circuit 33 extracts a received signal strength indicator (RSSI) signal 36 from the IF signal and delivers the RSSI signal 36 to an A/D converter 35. The A/D converter 35 A/D-converts the RSSI signal 36 into a signal level 39, which is output to the CPU 4.

Based on the incoming demodulated bit stream 38, the CPU 4 performs a message analysis and other operations during a receive task and causes a memory 5 to store analysis results. The CPU 4 also controls a conflict avoidance operation performed to re-allocate slots to avoid slot allocation conflicts with other stations, for instance. The memory 5 stores a slot allocation table 50 which is a table for storing slots reserved by individual stations for their scheduled transmissions. As long as individual TDMA communications apparatuses in a single network are working normally, all of these TDMA communications apparatuses keep common slot allocation information in their slot allocation tables 50.

Figure 3:
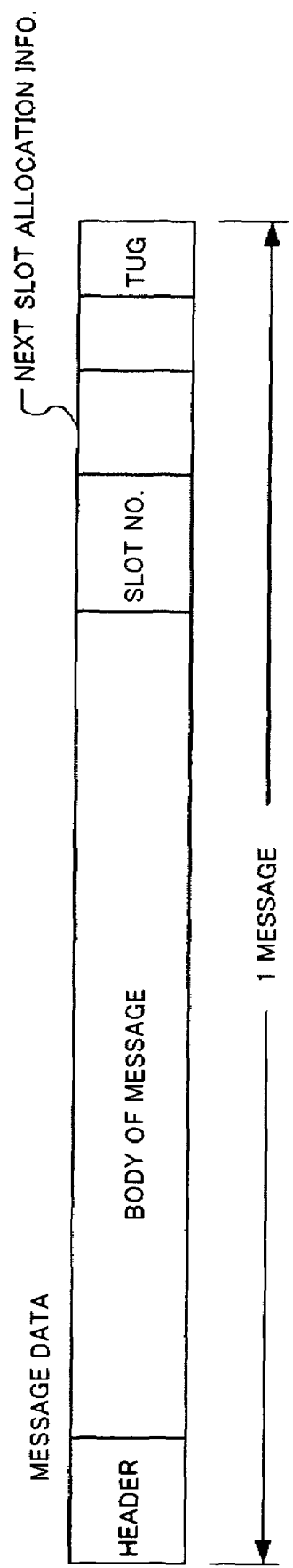
FIG. 3 is a diagram showing a format of message data.

A transmit circuit 6 receives binary bit data from the CPU 4 with specific slot timing. The transmit circuit 6 GMSK/FM-modulates a carrier signal with the binary bit data, amplifies a modulated signal and feeds a resultant GMSK/FM signal to the antenna 1. The binary bit data delivered from the CPU 4 to the transmit circuit 6 is message data structured in accordance with a format shown in FIG. 3. This message data contains a body text of message including Maritime Mobile Service Identity (MMSI, or station number) and position information, a transmit slot number and slot allocation information. The slot allocation information includes timeout value or offset slot number to the reserved slot in the next frame if message number is 1(SOTDMA), and includes offset slot number to the next reserved slot and keeps a flag (which specifies the reserved slot in the next frame) if message number is 3(IT-DMA), respectively.

Described below under (1) and (2) are conflict avoidance operations performed when a slot reserved by using the SOT-DMA protocol has been occupied by another station. (This slot reserved by the SOTDMA protocol is hereinafter referred to as the S slot for the sake of explanation. Similarly, the slot reserved by the ITDMA protocol is hereinafter referred to as the I slot.)

(1) Conflict avoidance operation performed when the TDMA communications apparatus detects that a slot allocated to own station in a next frame has been occupied by another station In the autonomous and continuous mode in which the TDMA communications apparatus is working in a stable fashion, the SOTDMA protocol is mainly used for the purpose of slot allocation.

The SOTDMA is a protocol which makes it possible to reserve the same slot for several successive frames starting from a current frame as long as a period defined by a time-out value. If the time-out is 4 (this value is normally selected from a range of 4 to 7), for example, the slot allocated in the next frame is designated S4 and the same slot in succeeding 4 frames is reserved as S3, S2, S1 and S0. But note that this reservation is the one when the station transmits the message which includes the information. So at the time of the slot S3 after 1 minute if the station transmits the message which specifies another information about the reservation different from the previous one, this information is prior and overrides the previous one.

Usually, after reserving the slots of the succeeding frames in a first frame in this way, the TDMA communications apparatus "formally" allocates slot S2 when transmitting in slot S3 of a third frame, for example. Further, the TDMA communications apparatus formally allocates slot S1 when transmitting in slot S2 of a fourth frame. In the SOTDMA protocol, the TDMA communications apparatus pre-reserves the same slot of multiple frames as many as the time-out value and formally allocates that slot at a point of transmission in the slot in each successive frame while decrementing the time-out value by 1. The TDMA communications apparatus of each station decrements the time-out value one by one in this slot allocation scheme. Therefore, it is possible for other stations to recognize how many frames the relevant slot should not be allocated for their own use referring to the time-out value transmitted from that TDMA communications apparatus. If the time-out value of one station is 3 (S3) for a particular slot in a current frame, for example, the other stations should refrain from allocating that slot for their own use for consecutive 4 frames including the current frame.

Figure 4A:
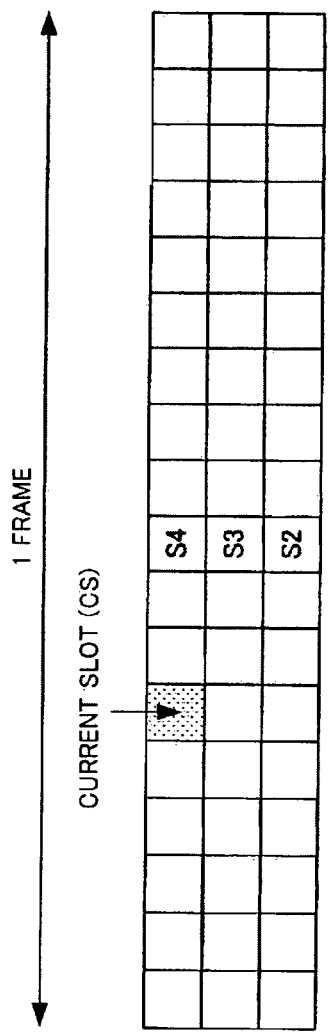
FIGS. 4A, 4B and 4C are diagrams showing operations performed in an S slot process for re-reserving new slots when an already reserved slot has been occupied by another station.

FIG. 4A is a diagram showing a situation in which slots have been reserved with the time-out initially set to 4 for own station by using the SOTDMA protocol. In FIG. 4A, CS indicates a system-synchronized slot which is to be transmitted currently. In the current slot CS, the TDMA communications apparatus of the own station edits message to be transmitted and actually transmits it.

Practically, editing the message for a particular slot is done by a certain number of slots prior to the timing when the current slot is arriving at the slot.

The duration of these slots, corresponding to a difference between the location of the editing slot and the location of the current slot CS in which the information is actually transmitted, gives a time period for editing the information.

Figure 4B:
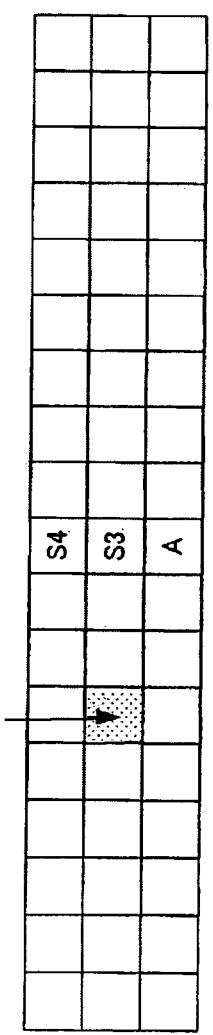

FIG. 4B is a diagram showing a situation in which one (slot S2) of the slots pre-reserved for the own station as shown in FIG. 4A has been occupied by another station. When the pre-reserved slot S2 is occupied by the other station, slot S2 is overwritten as slot A already allocated to the other station after transmitting the message at S4 as shown in FIG. 4B. Potential causes of this situation (slot allocation override by another station) are: (a) another station occupies the already reserved slot of the own station in obvious violation of the protocol; (b) a base station occupies the already allocated slot based on a privilege to use a desired slot; and (c) another station located far away fails to receive a slot allocation message from the own station and occupies the already allocated slot, regarding it as a free slot.

Figure 4C:
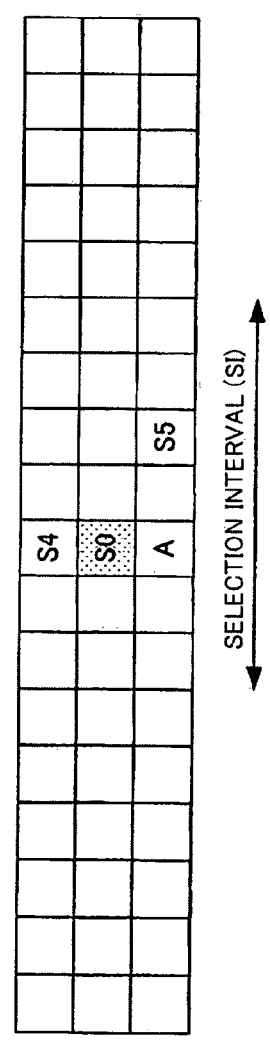

When the own station detects that a slot already allocated for its own use has been occupied by another station as mentioned above, the own station performs a conflict avoidance operation by re-reserving another slot instead of the occupied slot. Specifically, if the own station detects, referring to the slot allocation table 50, that the already reserved slot S2 (slot A) has been occupied by another station upon reaching slot S3 reserved in the frame preceding the frame of slot A, the own station sets the time-out to zero (S0) and transmits the message which includes the information "time-out=0" as shown in FIG. 4C. Then, the own station reselects and reserves another free slot within an SI in the next frame. Shown in FIG. 4C is an example in which a slot designated S5 within the SI has been judged to be a free slot (or an empty slot unreserved by other stations). Thus, the own station newly reserves slot S5 and slots at the same location in succeeding frames as many as the time-out value. When the own station has detected that the previously reserved slot in the next frame has been occupied by another station, the own station sets the time-out of the current slot to zero (0), finds a free slot within the SI in the succeeding frame, and newly reserves slots starting from the same position in the proceeding frames as described above. In this Specification, the aforementioned slot allocation operation is referred to as an "S slot process."

Figure 5:
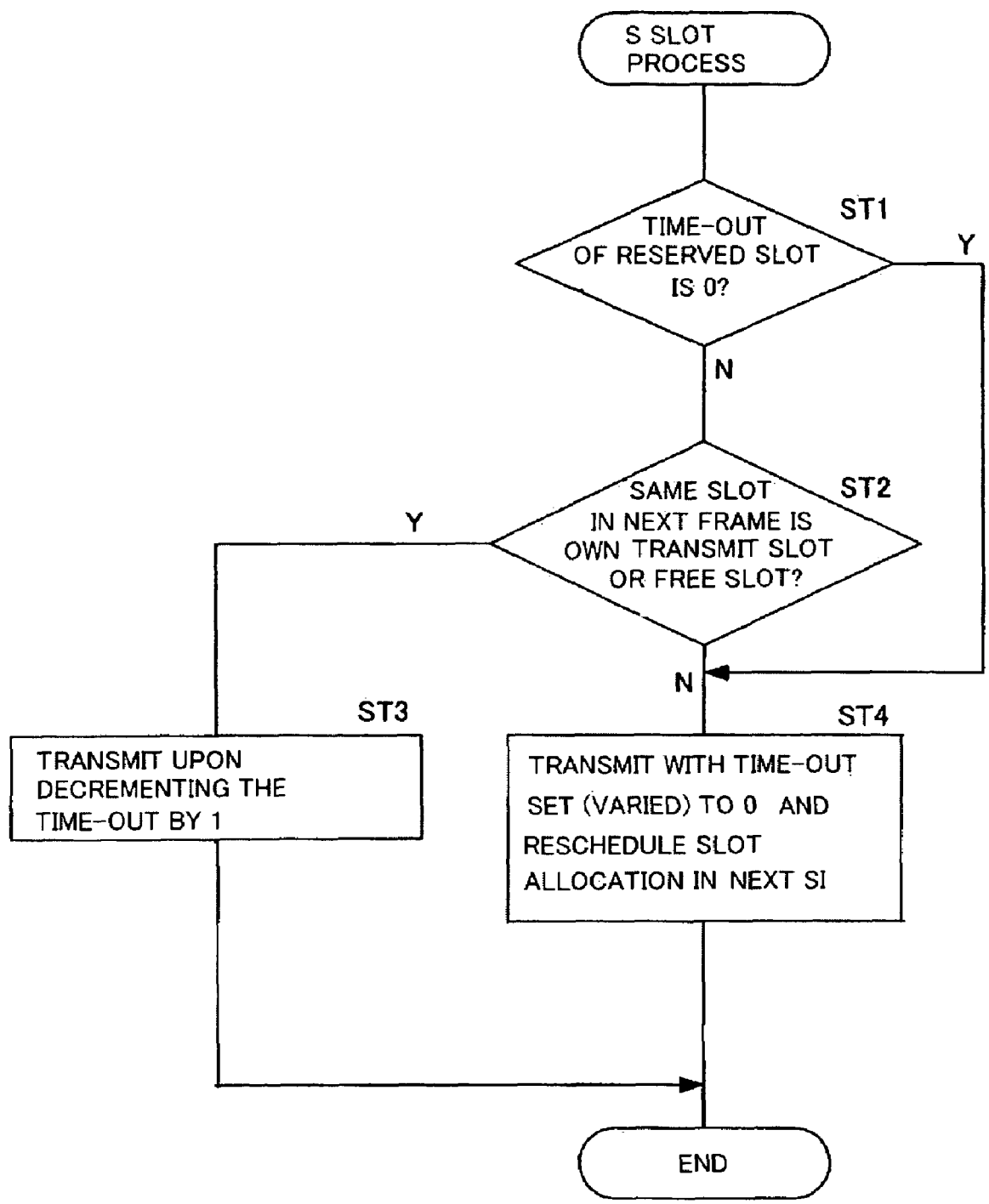
FIG. 5 is a flowchart showing a sequence of steps followed in performing the S slot process.

FIG. 5 is a flowchart showing a sequence of steps followed in performing the aforementioned S slot process.

First, the own station judges whether the time-out of the reserved slot is 0 (step ST1). If the time-out is 0 in step ST1, the own station transmits with the time-out set to 0 and reschedules slot allocation within a next SI (step ST4). If the time-out is not 0 in step ST1, the own station judges whether or not the same slot in the next frame is an own transmit slot or a free slot (step ST2). If the same slot in the next frame is judged to be neither an own transmit slot nor a free slot in step ST2, the own station proceeds to step ST4 and transmits with the time-out set to 0 and reschedules slot allocation within a next SI. This sequence of steps ST2 and ST4 corresponds to FIG. 4C. If the same slot in the next frame is judged to be an own transmit slot or a free slot in step ST2, the own station transmits upon decrementing the time-out by 1 (step ST3).

(2) Conflict avoidance operation performed when the TDMA communications apparatus detects that a next reserved slot in a current frame has been occupied by another station The aforementioned conflict avoidance operation described under (1) above applies to a case where the own station detects in a preceding frame that an already allocated own transmit slot has been occupied by another station. When the own station can detect one frame before that own transmit slot in a particular frame has been occupied by another station, it is possible to resolve this slot allocation conflict by the SOTDMA protocol. If the own station could detect only after a point one frame before, and not one frame before, that an already reserved own transmit slot in a particular frame has been occupied by another station, it would be impossible for the own station to re-reserve another slot in that particular frame by using the SOTDMA protocol. Should this situation occur, the ITDMA protocol is used to re-reserve another slot in the relevant frame.

Figure 6A:
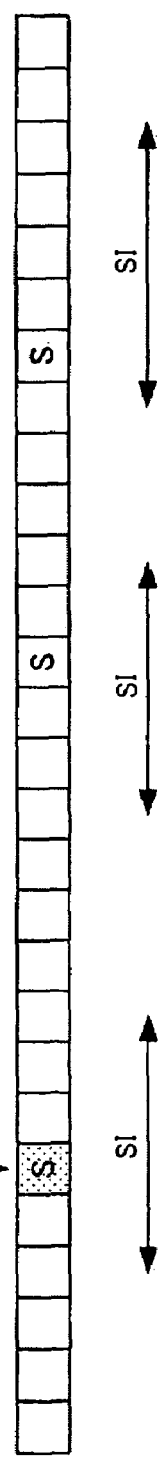
FIGS. 6A, 6B and 6C are diagrams showing operations performed in an S slot process associated with a report rate recovery function.
Figure 6B:
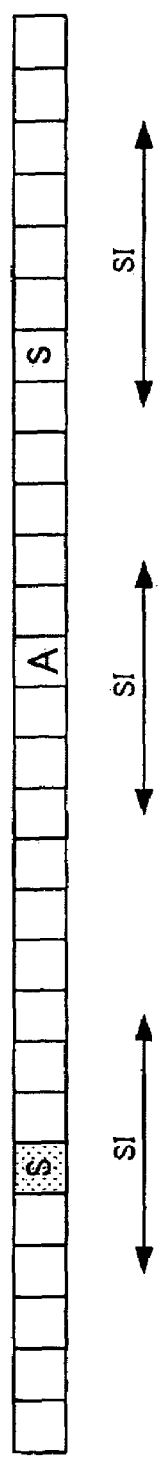
Figure 6C:
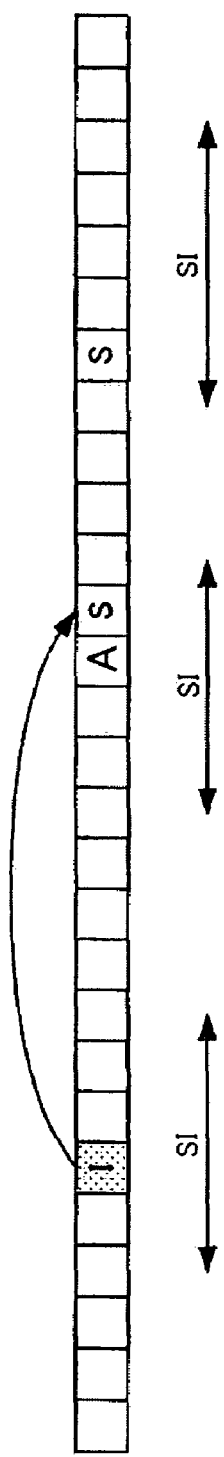

FIGS. 6A, 6B and 6C are diagrams showing a conflict avoidance operation performed by using the ITDMA protocol. In the autonomous and continuous mode, there exists one reserved slot (designated by the symbol S) for use by the own station within each SI as shown in FIG. 6A. According to ordinary operational rules of TDMA operation, these S slots are set at the same slot locations in succeeding frames as long as the time-out is non-zero. When the time-out becomes 0, a new slot for the own station is reselected within each SI. Consequently, a fixed number of S slots are always allocated in each successive frame, whereby the TDMA communications apparatus of the own station is controlled to transmit at a fixed message transmission rate, or report rate.

FIG. 6B is a diagram showing a situation in which one of the slots reserved within the successive SIs for the own station as shown in FIG. 6A has been occupied by another station or a situation in which no slots could be reserved at the transmission within the SI by using SOTDMA protocol due to a "slot pile up", etc.

When this situation is detected in the frame containing the slot occupied by another station, it is impossible to use the SOTDMA protocol as explained above with reference to the conflict avoidance operation described under (1). Thus, the own station resolves this slot allocation conflict by using the ITDMA protocol as shown in FIG. 6C. Since the ITDMA protocol allows the own station to specify the location of a newly reserved slot using offset field in the message, the own station can reserve a slot ahead in the same frame.

Specifically, when the own station detects at a current S slot that a slot reserved for own use within a next SI has been occupied by another station, the own station transmits an ITDMA message at the SOTDMA-allocated current S slot. More specifically, the own station finds a free slot within the next SI in the same frame and transmits an ITDMA message indicating a relative offset to that slot. According to ITDMA specifications, the ITDMA has functions similar to those of the SOTDMA except for a function of re-allocating a free slot as a newly reserved slot in the same frame as shown in FIG. 6C. Therefore, the own station can also reserve the same slot in the next frame by the ITDMA as done by SOTDMA.

When a slot reserved for own use within a particular SI has been occupied by another station or erased as mentioned above, resulting in a risk of slot allocation conflict or reducing a report rate, the own station can avoid the conflict by re-reserving another slot within the relevant SI by using the ITDMA protocol in the aforementioned manner. At the same time, the own station can also reserve one slot each within all SIs in the current frame. In this Specification, this slot allocation operation is referred to as an "S slot process associated with a report rate recovery function."

Figure 7:
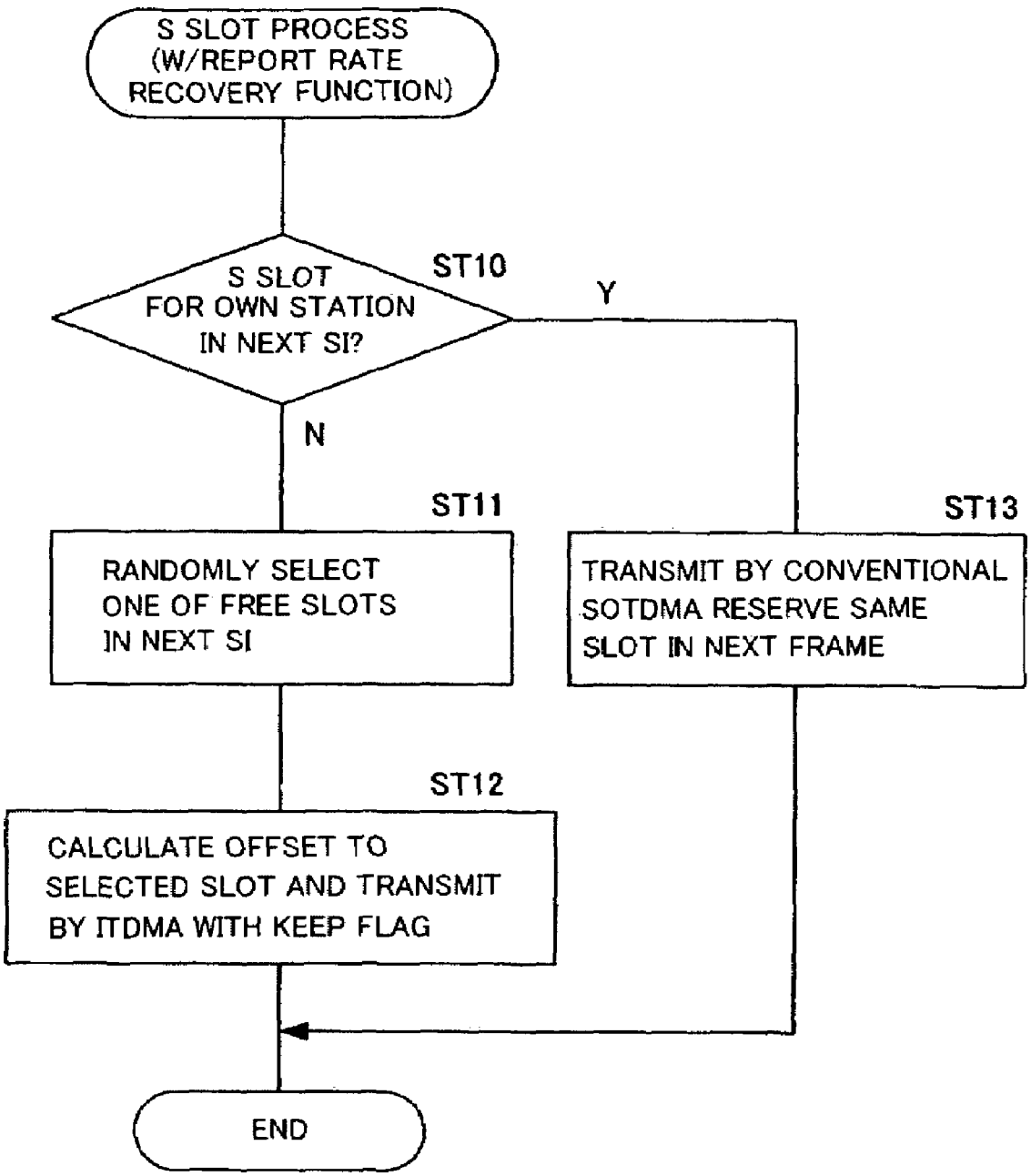
FIG. 7 is a flowchart showing a sequence of steps followed in performing the S slot process associated with the report rate recovery function.

FIG. 7 is a flowchart showing a sequence of steps followed in performing the aforementioned S slot process associated with the report rate recovery function.

First, the own station judges whether there exists an S slot reserved for own use within a next SI (step ST10). If the judgment result is in the affirmative in step ST10, the own station transmits by using the conventional SOTDMA protocol and reserves the same slot in the next frame (step ST13).

The own station judges whether there exists an S slot reserved for own use within the next SI in step ST10 as stated above. If the own station could not reserve a slot for own use within the next SI at a point of network entry or reserve a new slot at a time-out of 0 by the SOTDMA protocol, or if the already reserved slot has been occupied by another station, there can arise a situation in which there exists no S slot reserved for own use within the next SI. In this case, the own station randomly selects a free slot within the next SI (step ST11), calculates a relative offset to the selected slot and transmits by using the ITDMA. (step ST12). As a consequence, the selected slot is re-allocated for use by the own station. Also, by maintaining a keep flag in an ON state in the message, the own station reserves the same slot in the next frame at the same time, as is the case with the SOTDMA protocol (step ST12).

The aforementioned operation (the S slot process associated with the report rate recovery function) described under (2) above makes it possible to recover a normal report rate at when radio traffic conditions is improved even though it was impossible to reserve a slot allocated for the own station within a particular SI in the current frame. The I slot, which is the current transmit slot, and the newly reserved slot reselected and re-allocated for the own station by using the ITDMA protocol as shown in FIG. 6C are both treated as ordinary own transmit slots. Therefore, slots in succeeding frames are used to transmit ordinary SOTDMA messages.

While the TDMA communications apparatus of the present embodiment can resolve slot allocation conflicts by re-allocating slots by performing the S slot process shown in FIG. 4 and the S slot process associated with the report rate recovery function shown in FIG. 6 as discussed above, the apparatus also has an additional function of resolving slot allocation conflicts with other stations by correctly detecting free slots. This additional function is now described under (3) below.

(3) According to the UAIS specifications, slots allocated for transmission by another station are regarded as free slots which can be freely used by the own station after a lapse of 3 minutes if no message is received in those slots as scheduled. This inability to receive any message during a slot allocated for use by another station could occur in one of the following situations:

(a) There is no incoming signal at all in the relevant slot;

(b) The transmitting station is located so far away from the own station that the incoming signal can not be correctly demodulated;

(c) A message transmitted with an error in check byte calculation was received; or (d) A received signal could not be correctly demodulated due to a conflict among multiple stations.

In any of these situations, the value of cyclic redundancy check (CRC) calculated from demodulated data does not coincide with a block check character (BCC) so that the data is regarded as being erroneous and abandoned. Judging in accordance with a normal way of thinking, however, the relevant slot is "used" in any way under situations (a) through (d) above even if "no message is received." Therefore, further conflicts could potentially occur if the relevant slot is regarded as a free slot simply taking these situations as a state of absence of any received signal. Under this circumstance, the TDMA communications apparatus of this embodiment is provided with the aforementioned additional function of resolving slot allocation conflicts with other stations. This additional function permits the TDMA communications apparatus to avoid slot allocation conflicts by determining whether the received signal, if any, in a particular slot has a sufficient field strength correctly judging whether the slot is a free slot. In this Specification, operation performed by using this additional function of resolving slot allocation conflicts is referred to as an "error slot handling process associated with a conflict-derived error detecting function."

Figure 8:
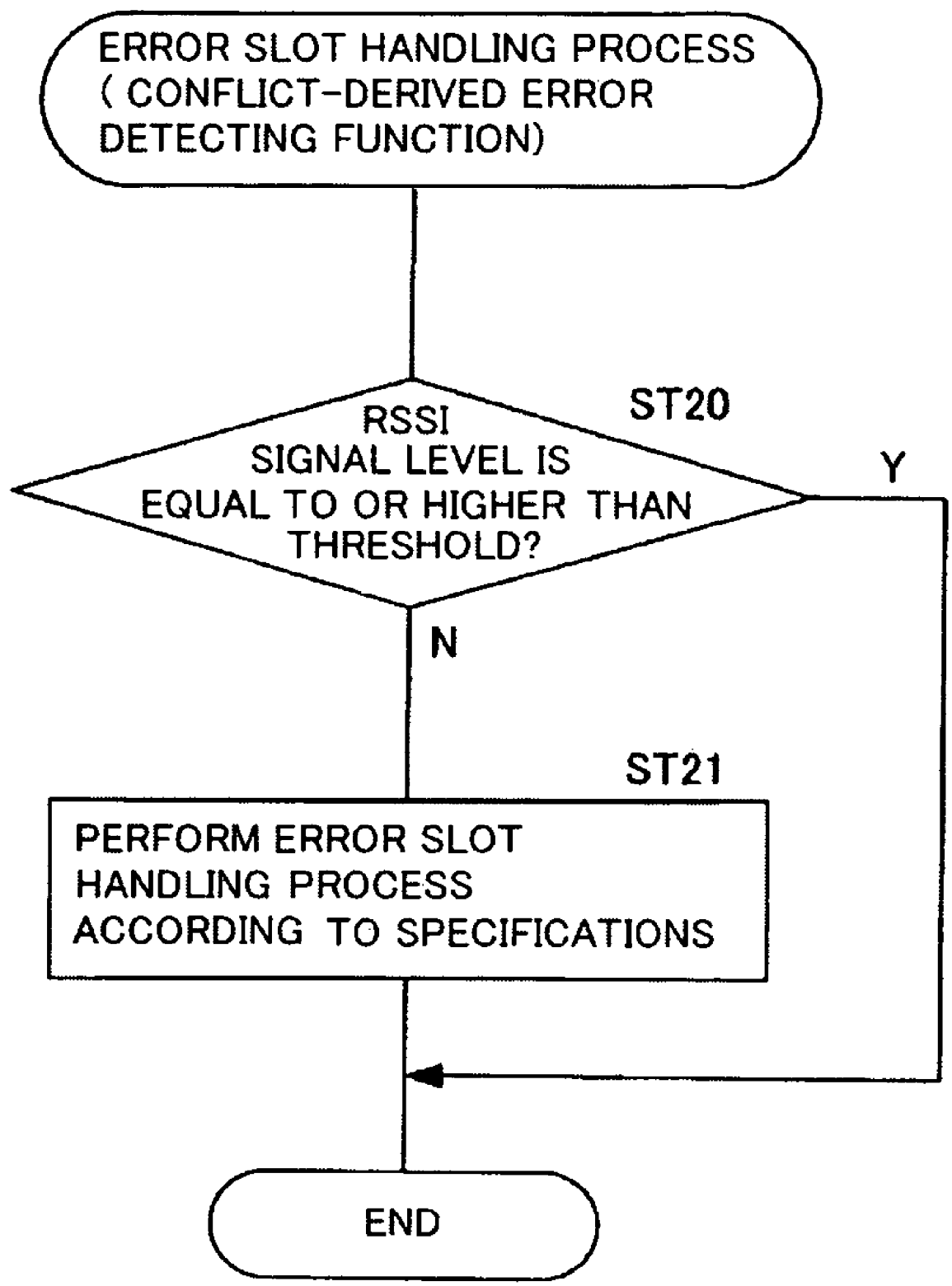
FIG. 8 is a flowchart showing a sequence of steps followed in performing an error slot handling process associated with a conflict-derived error detecting function.

FIG. 8 is a flowchart showing a sequence of steps followed in performing the aforementioned error slot handling process. In step ST20, the TDMA communications apparatus examines the RSSI signal (refer to FIG. 1) in a slot in which no message has been received due to the occurrence of a BCC error. There's no need to specify RSSI signal sampling timing particularly. If only one sample in the relevant slot is to be obtained, the RSSI signal may be sampled at a middle point in the slot. If it is possible to sample the RSSI signal a number of times, an average of multiple samples of the RSSI signal obtained by sampling through the entire slot in question may be used as a signal level. The TDMA communications apparatus judges whether any incoming signal exists in this channel within the relevant slot based on a comparison between the obtained signal level and a specific threshold. Specifically, if the level of the RSSI signal is not equal to or higher than the threshold, that is, if the apparatus judges that no incoming signal exists, the apparatus performs the error slot handling process according to the UAIS specifications in step ST21. The TDMA communications apparatus counts the number of times the level of the RSSI signal is judged to be less than the threshold. The error slot handling process performed in accordance with the UAIS specifications is an operation in which the TDMA communications apparatus increments this error count by one each time the level of the RSSI signal is judged to be less than the threshold and regards the relevant slot as a free slot when this count exceeds 3. Thus, if the sequence of steps ST20 and ST21 is executed three successive times for a particular slot, the slot is judged to be a free slot which may be reserved for the own station. If the level of the RSSI signal is judged to be equal to or higher than the threshold in step ST20, on the other hand, the relevant slot is regarded as an occupied (non-free) slot because there exists a high possibility that the slot has been allocated to an other station and the same slot will also be used in the next frame.

The aforementioned error slot handling process associated with the conflict-derived error detecting function makes it possible to correctly determine a free slot which can be reserved for the own station without causing any conflict with other stations.

In the aforementioned TDMA communications apparatus, the Selection Interval (SI) is determined in accordance with the velocity of a mobile unit, such as a ship, on which the TDMA communications apparatus is installed. If the mobile unit has a high moving speed, it is necessary to increase the number of reserved slots since the mobile unit changes its location by a large amount within a given period of time. In this case, the value of SI decreases and the number of SIs per frame increases. If the mobile unit has a low moving speed, on the other hand, the value of SI increases and the number of SIs per frame decreases.

The TDMA communications apparatus of the invention further has a function of detecting transmission-related violations conducted by other stations. While the UAIS specifications give some examples of obvious violations of pertinent standards and rules, the specifications include neither a specific description of acts against the spirit underlying the standards and rules nor a description of methods or means with respect of how such violations and illegal acts should be detected. The TDMA communications apparatus disclosed in this invention has a function of monitoring, detecting and recording these violations and illegal acts in a manner extractable on-line and offline.

Specific types of violations and illegal acts which are monitored, detected and recorded by this function of the TDMA communications apparatus are as follows:

1. Violations of slot allocation method

1a) A station reserves multiple slots but uses only part of the reserved slots

1b) An act of varying the time-out value without justifiable reason

1c) An act of reserving a slot in a frame more than one frame ahead

1d) An act of reserving a slot within other than a pertinent SI

1e) A prohibited act or an act conducted in negligence of the order of priority in case of slot reservation 2. Transmission-related violations 2a) Violation in link entry mode 2b) Violation in autonomous and continuous mode 2c) Violation in link abort operation 2d) Violation related to access schemes Now, a processing method for detecting and recording these violations and illegal acts is explained with reference to FIG. 9 which is a conceptual diagram showing this processing method.

Figure 9:
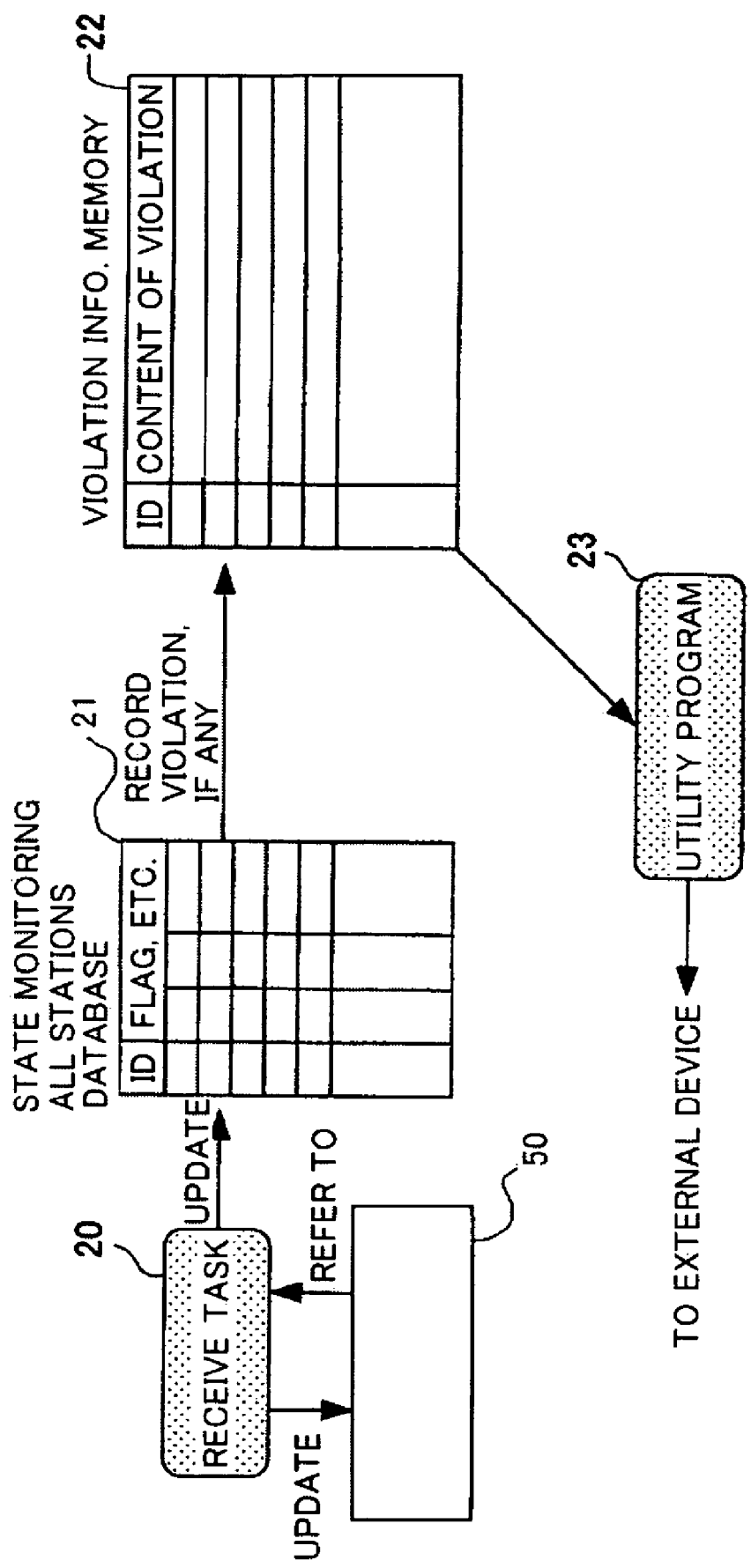
FIG. 9 is a conceptual diagram showing a processing method of detecting and recording violations and illegal acts.

The violations and illegal acts are detected by a receive task program module in principal. Specifically, upon receiving a message from another station, the receive program module of the own station analyzes the content of the message while examining whether the message contains any of various violations and illegal acts mentioned above. For this purpose, a receive task 20 utilizes the slot allocation table 50 and a state monitoring all stations database 21 as shown in FIG. 9. The slot allocation table 50 is not a table dedicated exclusively to detecting violations and illegal acts but a table used for selecting free slots to be reserved for transmission. On the other hand, the state monitoring all stations database 21 is a database dedicated to detecting violations and illegal acts. The state monitoring all stations database 21 stores information on states (speeds, distances from the own station, report rates, etc.) of all or part of other stations together with their station IDs (MMSI, or station number). While the information stored in the state monitoring all stations database 21 is updated in real time, the receive task 20 checks out received messages for any violation or inconsistency in the content of each message. If any violation or illegal act has been detected, information on such violation or illegal act is recorded in a violation information memory 22 which constitutes another database. Each piece of information, or comment, stored in the violation information memory 22 is indexed by a pertinent station ID. Preferably, the violation information memory 22 is backed by a keep-alive battery or flash memory to avoid loss of memory content in case of power failure, for example. A utility program 23 reads out necessary information from the violation information memory 22 and outputs the information to an external device at any desired point in time. If the TDMA communications apparatus is connected to an external device, such as a personal computer, there may be made an arrangement to output the content of the violation information memory 22 in real time. Now, specific examples of the aforementioned types of violations and illegal acts and methods of detecting the same are explained in detail in the following paragraphs.

1a) A station reserves multiple slots but uses only part of the reserved slots

Figure 10:
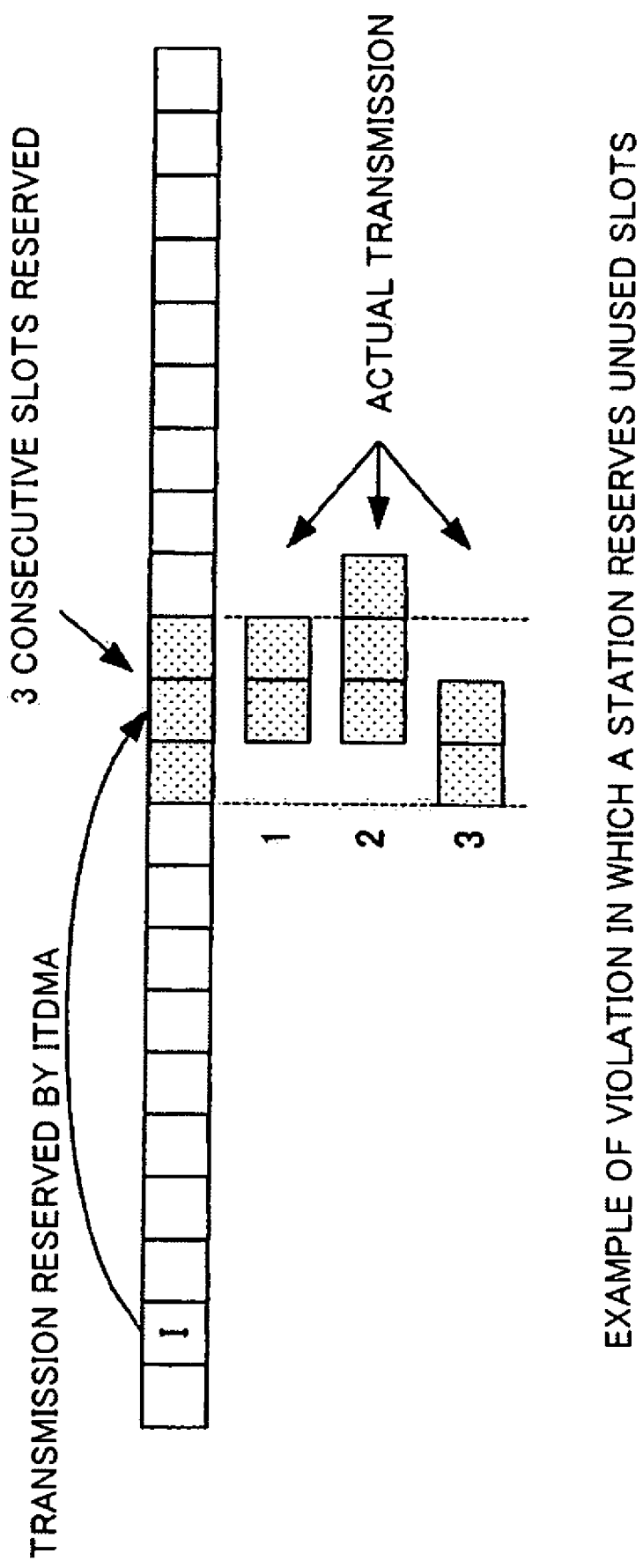
FIG. 10 is a diagram showing a specific example of a violation in which a particular station uses only part of reserved slots.

FIG. 10 shows a specific example of the aforementioned type 1a) violation. Although it is possible to allocate up to 5 slots for one message transmission according to the UAIS specifications, it is apparently an act against the spirit of the UAIS rules to reserve a larger number of slots than actually needed for transmission. It is also an apparent violation of UAIS rules to transmit beyond the extent of reserved slots. Shown in FIG. 10 is a case where a station has reserved 3 consecutive slots by using the ITDMA protocol. If only 2 slots are actually needed for transmission as shown in examples numbered 1 and 3 in FIG. 10, 1 extra slot is unnecessarily allocated to the station. Even if 3 consecutive slots are actually needed for transmission as shown in an example numbered 2 in FIG. 10, transmitting beyond the extent of the reserved slots also constitutes an apparent violation. This type of violation is detected by a procedure explained below.

Upon receiving a message from another station, the receive task 20 examines the first one and the number of consecutive slots reserved by that station including a current slot referring to the location of the current slot and its vicinity stored in the slot allocation table 50. The receive task 20 determines whether there has been a violation corresponding to example 1, 2 or 3 of FIG. 10 by comparing the location of the first one and the number of the consecutive slots reserved by the other station to the location of the current slot and the number of the slots written in the message.

1b) An act of varying the time-out value without justifiable reason

Figure 11:
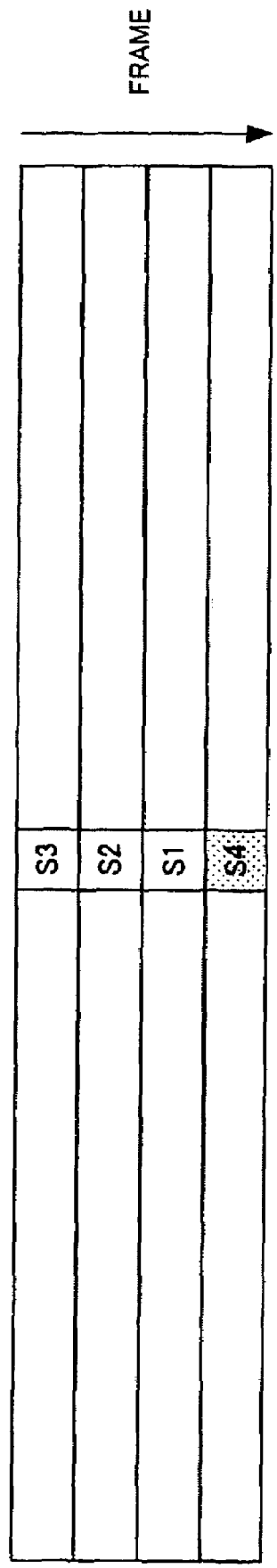
FIG. 11 is a diagram showing a specific example of a time-out value-related violation.

FIG. 11 shows a specific example of the aforementioned type 1b) violation, or time-out value-related violation. A time-out value is determined at SOTDMA transmission. The time-out value is normally selected from a range of 3 to 7. According to the UAIS specifications, the time-out value is decremented by 1 each time the TDMA communications apparatus proceeds to a next frame, such as from S3 to S2, and then to S1 as shown in FIG. 11. Although it is permitted in the transmission to forcibly reset the time-out value to zero (0) and make a final transmission when quitting from a network link or avoiding conflicts, it is considered as an act against the spirit of the UAIS rules to update the time-out to a value other than zero (0) or a value decremented by the value other than 1 as shown in FIG. 11. In the example of FIG. 11, the time-out is updated from 1 (S1) to 4 (S4), and not from 1 (S1) to 0 (S0). This type of violation is detected by a procedure described below.

If a message received from another station is an SOTDMA message, the receive task 20 compares a scheduled time-out value (written in the "next slot allocation information" of FIG. 3) included in the message with a time-out value stored at a corresponding slot location on the slot allocation table 50. If the two time-out values do not coincide with each other and the time-out value indicated in the message just received is other than zero (0), the receive task 20 judges that the other station transmitted the message in violation of the UAIS rules.

Figure 12:
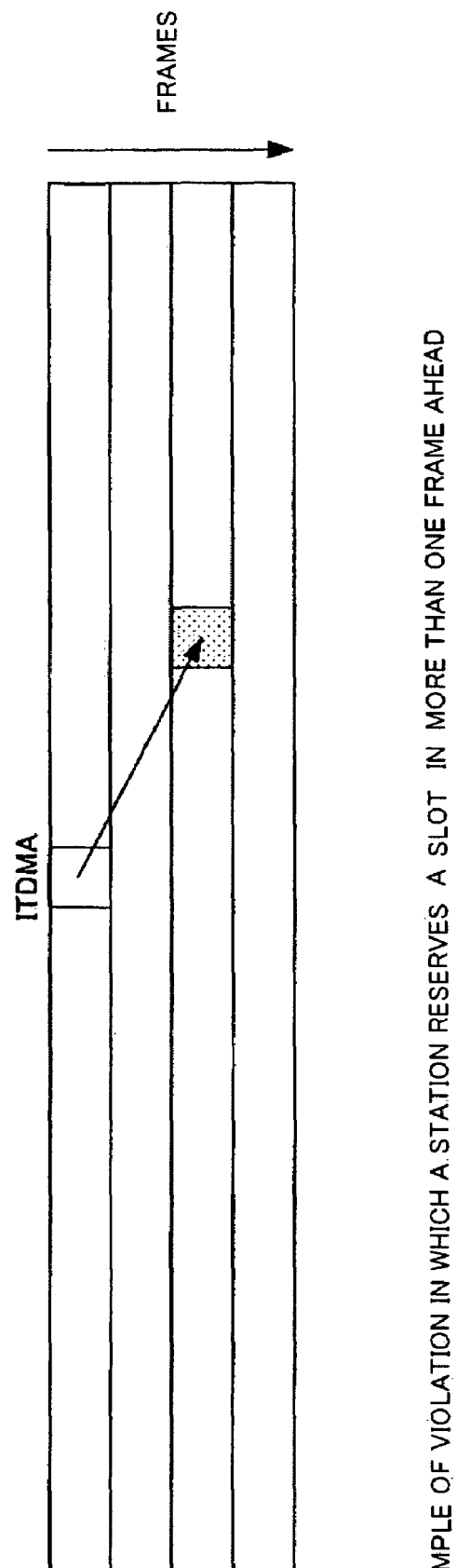
FIG. 12 is a diagram showing a specific example of a violation in which a particular station reserves a slot in a frame more than one frame ahead by using the ITDMA protocol.

1c) An act of reserving a slot in a frame more than one frame ahead by using the ITDMA protocol FIG. 12 shows a specific example of the aforementioned type 1c) violation. When a particular station transmits a message by using the ITDMA protocol, the station can reserve slots using the aforementioned ITDMA protocol. In other words, the station reserves a slot by specifying a relative offset from a current transmission slot to the location of that slot when transmitting an ITDMA message. If this relative offset is larger than 2,250 slots (=1 frame), however, the receive task 20 regards such slot allocation as being against the spirit of the UAIS rules. This type of violation is detected by a procedure described below.

Specifically, the receive task 20 examines the amount of offset upon receiving an ITDMA message and, if the offset is larger than 2,250 slots, the receive task 20 regards the slot allocation indicated in the message as being against the spirit of the UAIS rules.

The UAIS rules require that every station make data content of the slot allocation table 50 complete before entering the network link. The UAIS rules mandate every participating station to watch messages received during a 1-frame-long "monitoring period" before transmitting any messages. This means that a participating station is allowed to participate in the network link only after examining which slots are already allocated to which participating stations and determining which slots should not be occupied (allocated) by own station. If the participating station is allowed to reserve a slot in a frame more than one frame ahead, however, it is likely that the station can not complete a correct slot map at the end of the monitoring period, causing thereby a slot allocation conflict. This is why the act of reserving a slot in a frame more than one frame ahead is judged to be violating the UAIS rules.

1d) An act of reserving a slot within other than a pertinent SI

Figure 13:
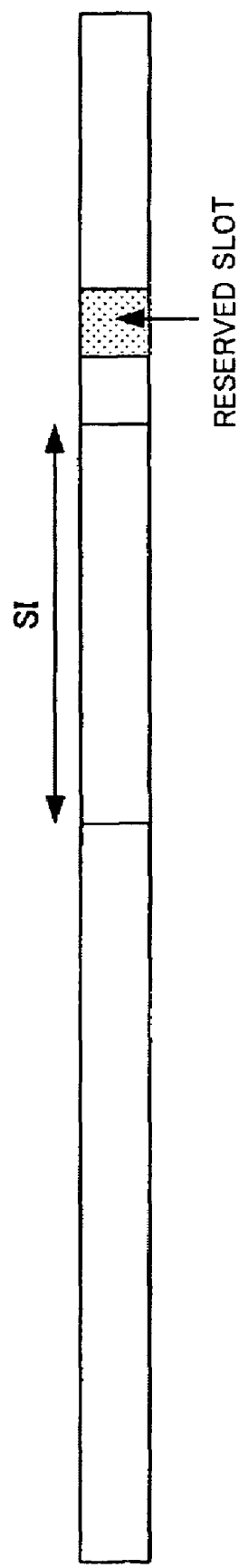
FIG. 13 is a diagram showing a specific example of a violation in which a particular station reserves a slot within other than a pertinent SI.

FIG. 13 shows a specific example of the aforementioned type 1d) violation.

In order to transmit at regular intervals in the autonomous and continuous mode, a station is required to vary the locations of own transmit slots (slot numbers) at random within a specific range(SI). For example, a station which has first allocated slot No. 2 and the same slot (slot No. 2) as many times as the time-out value for own transmission must control the TDMA communications apparatus such that it would reserve other slots than slot No. 2 in frames following the time-out. The aforementioned SIs make it possible to randomly vary the slot allocated to own station. The positions of SIs are determined based on the moving speed of the own station, for instance, at a point of network entry. Each station must reserve own transmission slots within the SIs thus determined. Each station can recognize SIs of other stations to a certain extent by referring to information on the relevant other stations stored in the state monitoring all stations database 21, that is, such attributes as slots which have been used so far, moving speed and report rate at a point of network entry of each of the other stations. The receive task 20 examines whether slots (i.e., succeeding slots in the current frame in the case of ITDMA, slots in the next frame in the case of SOTDMA) reserved by a station when each of messages transmitted at regular intervals from that station lie within the SIs and, if the slots reserved by that station do not lie within the SIs, the receive task 20 judges that the slot allocation by the relevant station violates the UAIS rules.

Figure 14:
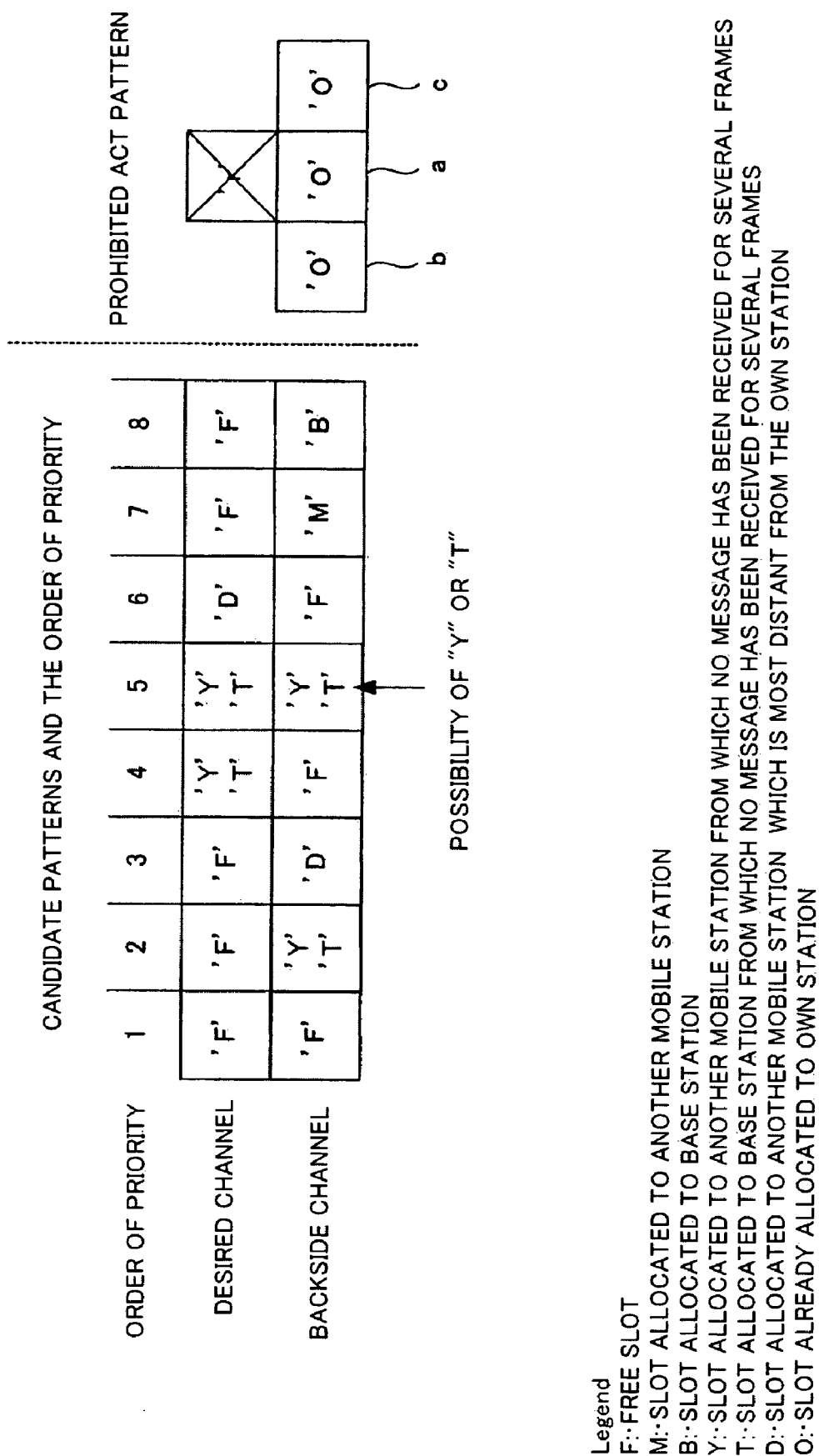
FIG. 14 is a diagram illustrating a prohibited act and an act conducted in negligence of the order of priority.
Figure 15:
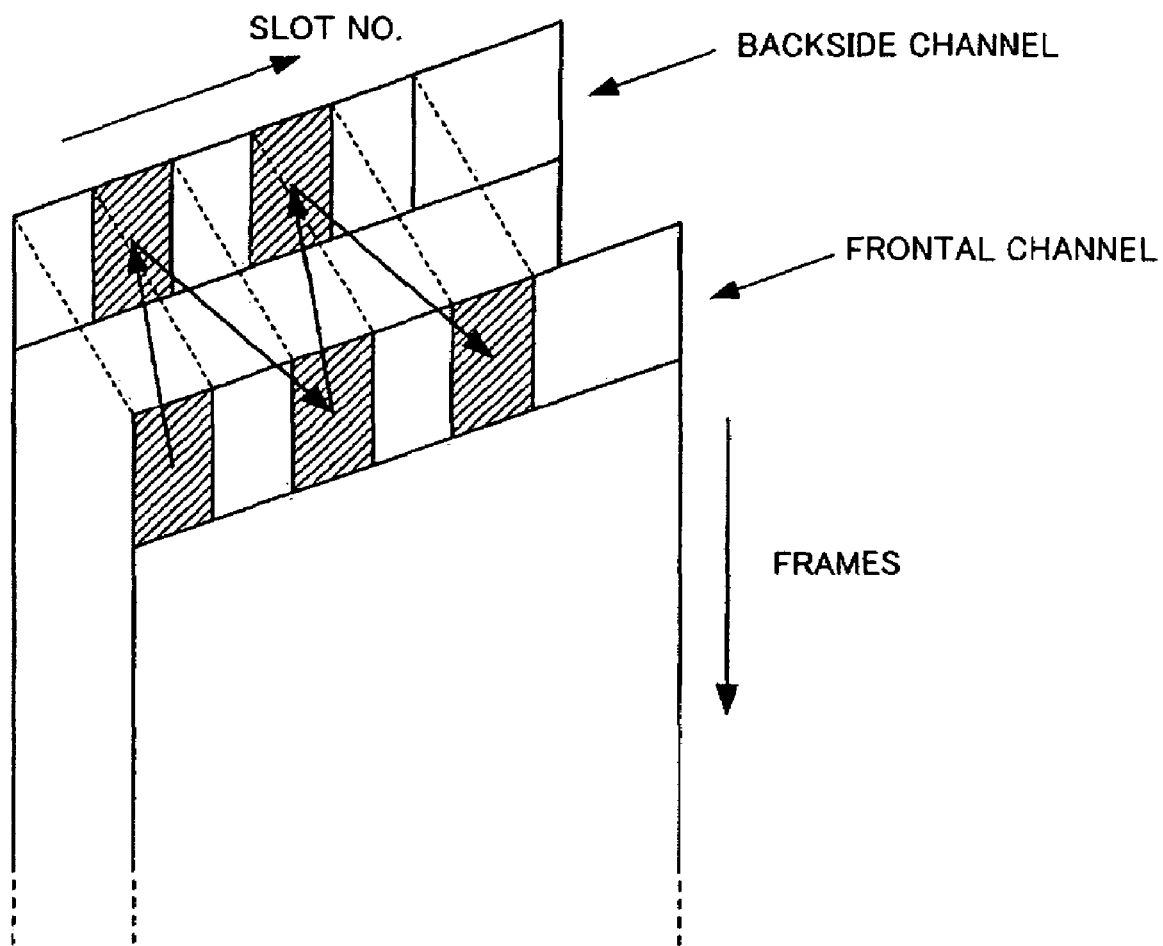
FIG. 15 is a diagram showing a relationship between alternately used frontal and backside channels.

1e) A prohibited act or an act conducted in negligence of the order of priority in case of reserving a slot FIG. 14 shows an act conducted in negligence of the order of priority and a pattern of prohibited act when allocating the slot. First, a general slot allocation rule is explained. The receive task 20 selects at least 4 candidate slots within an SI from the slot allocation table 50. There are eight types of priority order as indicated by the numbers 1 to 8 in FIG. 14. The TDMA communications apparatus is so constructed as to transmit and receive on a pair of channels having different frequencies. For the convenience of explanation, one of these channels is referred to as a frontal channel (a desired channel in which the apparatus is going to reserve a slot) whereas the other is referred to as a backside channel in the following discussion. The TDMA communications apparatus transmits on the frontal and backside channels in an alternate sequence as illustrated in FIG. 15.

Referring to FIG. 14, priority order type 1 is a case in which both the frontal and backside channels at the same location are a free slot having an attribute designated by "F" (free slot). To select 4 or more candidate slots within a single SI, the TDMA communications apparatus searches for candidates which meet the conditions of the priority level, which varies starting from the priority order type 1. The candidate slots are determined when the number of candidates detected has reached 4 at the certain priority level and then the TDMA communications apparatus randomly selects one of these candidate slots. This sequence makes it possible to select slots in a random way based on the order of priority.

The aforementioned act conducted in negligence of the order of priority occurs in a case where a station selects a slot from the candidate slots determined as stated above. If a slot corresponding to a pattern of priority order type 3 is designated as a reserved slot in a message received from a particular station despite the fact that 5 candidate slots are available in a pattern of priority order type 1, for example, the receive task 20 judges that the slot allocation by that station is a violation of the UAIS rules.

A prohibited act pattern is now described. The prohibited act pattern is a pattern which should never be reserved. Selecting a slot designated by "X" in FIG. 14 constitutes a prohibited act, for example. A typical example of prohibited acts is a case where a frontal channel slot is going to be allocated despite that a backside channel slot at the same location has been reserved by the own station (a). Similarly, a case where a frontal channel slot is going to be allocated despite that either of backside channel slot adjacent to the aforementioned slot has been reserved by the own station (b, c) is also an example of prohibited acts.

The receive task 20 can detect the aforementioned prohibited acts and acts conducted in negligence of the order of priority by referring to the slot allocation table 50 and the state monitoring all stations database 21.

Figure 16:
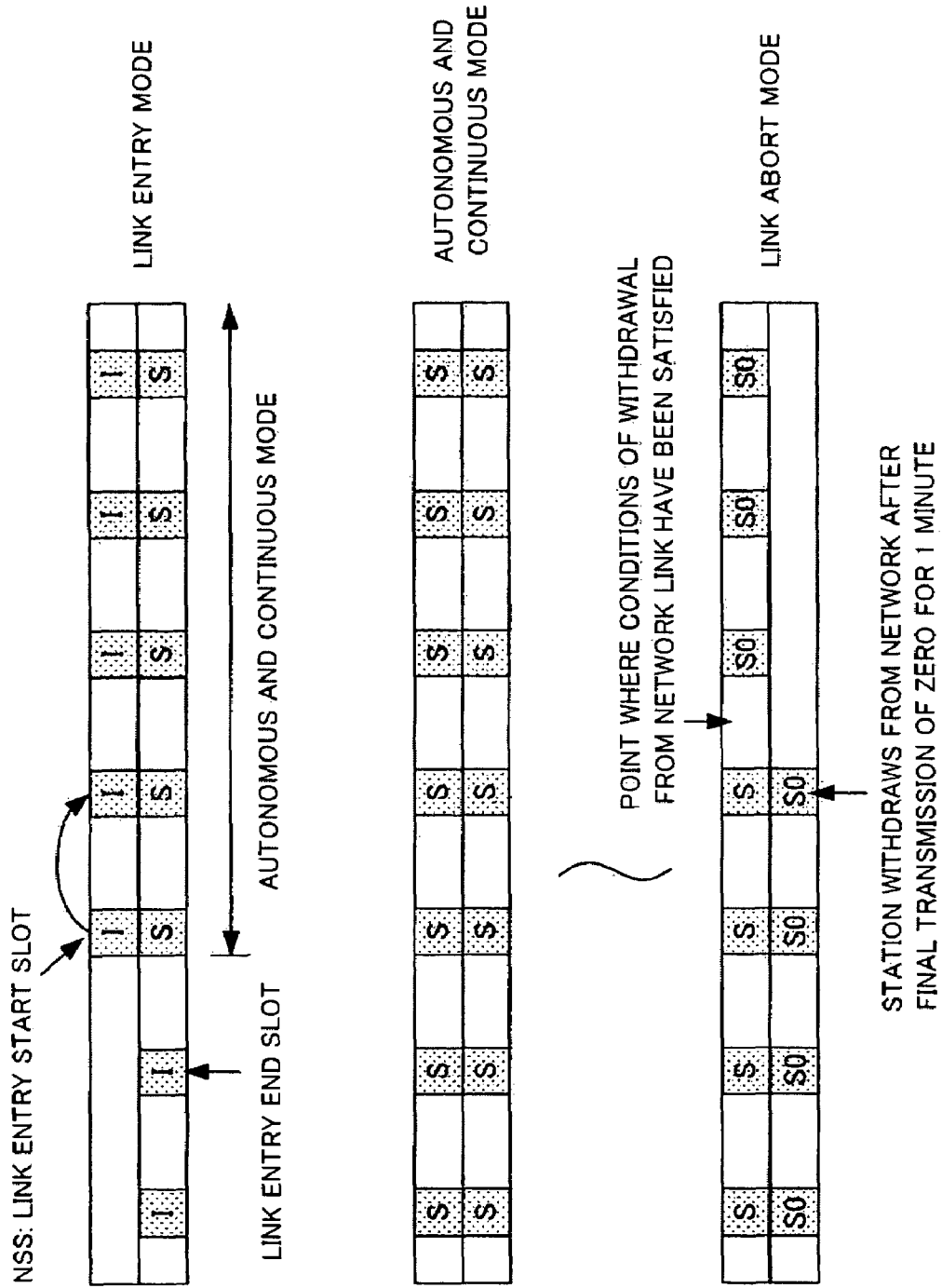
FIG. 16 is a diagram showing transmit modes under network participating conditions and a protocol.

2. Transmission-related violations
2a) Violation in link entry mode
2b) Violation in autonomous and continuous mode
2c) Violation in link abort operation FIGS. 16 and 17 are diagrams showing specific examples of the above violations.

According to UAIS protocols, there are provided link entry mode, autonomous and continuous mode and link abort mode used for transmitting periodical reports within a frame.

Conditions in which the TDMA communications apparatus is in any of the aforementioned modes are referred to as network participating conditions in this Specification. State transition among these modes is controlled by a particular rule. Specifically, own station transfers from one state to another among states including a state in which the own station has withdrawn from the network in a controlled, or restricted, manner as shown in FIG. 17. Should there exist a plurality of stations, there are as many kinds of state transition as the number of the stations. A station participates in the network from the link entry mode. In the link entry mode, the station transmits ITDMA messages using the ITDMA protocol for a duration of 1 minute and, then, transfers to the autonomous and continuous mode as shown in FIG. 16. In the autonomous and continuous mode, slots are sequentially allocated by the aforementioned S slot process mainly using the SOTDMA protocol. When withdrawing from the network, the TDMA communications apparatus quits the network participating conditions from the autonomous and continuous mode through the link abort mode. In the link abort mode, the TDMA communications apparatus finally transmits zero (S0) for a 1-minute period (1 frame) before leaving the network. Then, the TDMA communications apparatus sets a mode detecting flag for each station in the state monitoring all stations database 21 as shown in FIG. 17.

Figure 17:
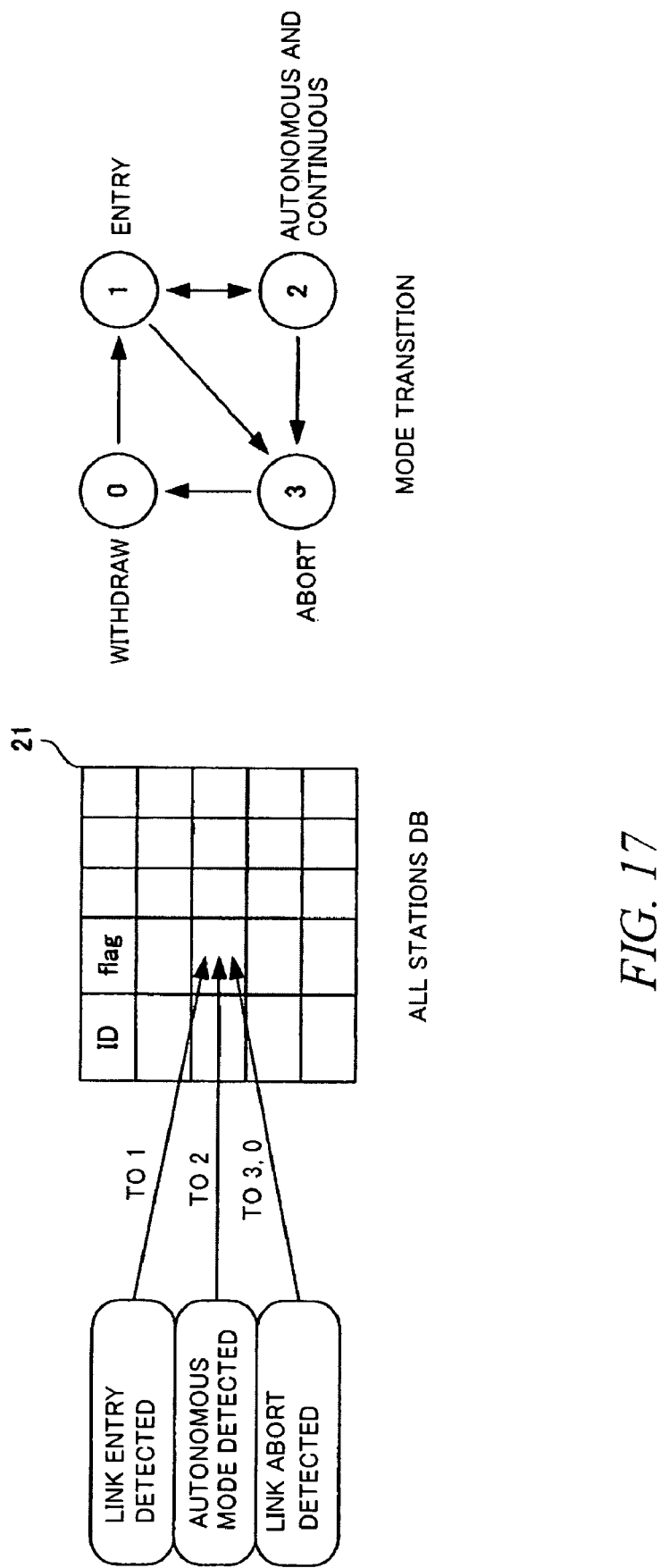
FIG. 17 is a network state transition diagram.

The aforementioned mode-related violations occur when the receive task 20 detects that a message has not been transmitted according to a defined format and procedure or a message indicating other than permissible forms of state transition shown in FIG. 17 has been received For example, the aforementioned type 2a) violation in the link entry mode occurs when slots are abruptly allocated by the SOTDMA protocol which is used in the autonomous and continuous mode, although the slots should be allocated by using the ITDMA protocol. Also, the aforementioned type 2b) violation in autonomous and continuous mode occurs when the ITDMA protocol is used in allocating slots although the SOTDMA protocol should be used unless its speed or rate of turn has changed. Further, the 2c) violation in link abort operation occurs when a particular station stops to transmit without properly withdrawing from the network after resetting the time-out value to zero (S0).

The mode-related violations are detected by comparing modes of individual stations stored in the state monitoring all stations database 21 and modes estimated from message contents received from the respective stations. If the mode of a particular station read out from the state monitoring all stations database 21 does not coincide with its estimated mode, the receive task 20 judges that the pertinent station made a mode-related violation.

2d) Violation related to access schemes

The UAIS rules stipulate slot allocation methods (access schemes). According to the rules, each station should adopt a specific access scheme, and not an arbitrary access scheme, when transmitting a specific message. The access schemes includes (a) random slot allocation performed by using Random Access Time Division Multiple Access (RATDMA); (b) slot allocation in a preceding frame by SOTDMA; (c) slot allocation by using relative offsets by ITDMA; and (d) a declaration of occupation of all slots throughout 1 frame by Fixed Access Time Division Multiple Access (FATDMA). Whichever slot allocation method is used, each station can recognize the allocation method (access scheme) when receiving the message which announces the slot reservation and its message number at that slot.

In this embodiment, there is provided a field in the slot allocation table 50 indicating an access scheme used in allocating each slot. It is possible to judge whether there is any violation related to access schemes by comparing the access scheme written in that field with the actual received message number.

According to the aforementioned embodiment of the invention, the TDMA communications apparatus can monitor and detect violations and acts against the spirit of the UAIS rules by itself and record such violations and illegal acts in a violation log. The invention contributes to an improvement in the performance of the apparatus as well as to standardization of the relevant standards and rules.

What is claimed is:

1. A TDMA communications apparatus for carrying out communication using TDMA technology in which a frame is divided into a plurality of slots, a slot being treated as a unit of data transmission, and said TDMA communications apparatus performs TDMA communication while reserving slots for own transmission, said TDMA communications apparatus comprising:

conflict avoidance means for avoiding slot allocation conflicts with other stations by transmitting a message indicating that own station will re-reserve another slot for own transmission within a predefined period upon detecting that a slot reserved for own use has been reserved by another station as well, wherein said TDMA communications apparatus having a mode in which a slot at the same location as a current slot is reserved in each of succeeding frames, wherein the conflict avoidance means transmits a message indicating that the own station will re-reserve another slot for own transmission within the predefined period in a next frame upon detecting that a slot reserved for own use in the next frame has been reserved by another station as well.

2. The TDMA communications apparatus according to claim 1, wherein the predefined period is set based on the speed of a mobile unit on which said TDMA communications apparatus is installed.

3. The TDMA communications apparatus according to claim 1, wherein said TDMA communications apparatus further comprising:

means for evaluating the level of a signal received in each slot a plurality of times and judging a slot in which the level of the received signal is less than a threshold for a specific number of times as a free slot which may be reserved for own transmission without causing a conflict with other stations.

4. The TDMA communications apparatus according to claim 1, wherein said TDMA communications apparatus further comprising:

means for recovering a report rate by allocating a new slot within a defined next selection interval (SI) using ITDMA protocol when the communication apparatus detects that the own slot within the next SI has been erased or overridden by other stations or is not found due to a traffic situation.

5. A TDMA communications apparatus for carrying out communication using TDMA technology in which a frame is divided into a plurality of slots, a slot being treated as a unit of data transmission, and said TDMA communication, said TDMA communications apparatus comprising:

conflict avoidance means for avoiding slot allocation conflicts with other stations by transmitting a message indicating that own station will re-reserve another slot for own transmission within a predefined period upon detecting that a slot reserved for own use has been reserved by another station as well, wherein said TDMA communications apparatus having a mode in which a slot at the same location as a current slot is reserved in each of succeeding frames, wherein the conflict avoidance means transmits a message indicating that the own station will re-reserve another slot for own transmission within the predefined period in a current frame upon detecting that a next slot reserved for own use in the current frame has been reserved by another station as well.

6. The TDMA communications apparatus according to claim 5, wherein the predefined period is set based on the speed of a mobile unit on which said TDMA communications apparatus is installed.

7. The TDMA communications apparatus according to claim 5, wherein said TDMA communications apparatus further comprising:

means for evaluating the level of a signal received in each slot for a plurality of times and judging a slot in which the level of the received signal is less than a threshold for a specific number of times as a free slot which may be reserved for own transmission without causing a conflict with other stations.

8. The TDMA communications apparatus according to claim 5, wherein said TDMA communications apparatus further comprising:

means for recovering a report rate by allocating a new slot within a defined next selection interval (SI) using ITDMA protocol when the communication apparatus detects that the own slot within the next SI has been erased or overridden by other stations or is not found due to a traffic situation.

9. A TDMA communications apparatus for carrying out communication using TDMA technology in which a frame is divided into a plurality of slots, a slot being treated as a unit of data transmission, and said TDMA communications apparatus performs TDMA communication while reserving slots for own transmission, said TDMA communications apparatus comprising:

a detection unit detecting violations;

a violation information memory for storing the detected violations, in a manner that allows a comparison between, content of a slot allocation table and/or database of other stations storing slot allocation status of each station and received messages; and a readout device reading out information from the violation information memory, wherein the violations included at least one of the following violations:

a violation of a predetermined rule, a violation in a link entry mode, a violation in an autonomous and continuous mode, a violation in a link abort operation, a violation related to an access scheme, a violation wherein a station reserves multiple slots and uses only part of the multiple reserved slots, a violation being an act of varying a time-out value when the varying of the time-out value was determined to be unnecessary, a violation being an act of reserving a slot in a frame more than one frame in advance, a violation being an act of reserving a slot not in a pertinent selection interval, a violation being a prohibited act, and a violation being an act of slot reservation not in accordance with an order of priority.

* * * * *